United States Patent [19]

Fushimi et al.

[11] Patent Number: 4,786,779
[45] Date of Patent: Nov. 22, 1988

[54] SAW BLADE SEGMENT WELDING APPARATUS

[75] Inventors: Tsunehisa Fushimi; Tomoo Tashiro; Shigeru Suzuki; Tatsuo Kakizaki, all of Kanagawa, Japan

[73] Assignee: Dengensha Manufacturing Company Limited, Kanagawa, Japan

[21] Appl. No.: 945,980

[22] Filed: Dec. 24, 1986

[30] Foreign Application Priority Data

Dec. 27, 1985 [JP] Japan .............................. 60-294996
Jan. 10, 1986 [JP] Japan .................................. 61-3882

[51] Int. Cl.⁴ ...................... B23D 63/04; B23K 31/04
[52] U.S. Cl. .................................. 219/77; 219/76.17; 219/159; 219/86.7
[58] Field of Search ............. 219/76.17, 77, 78.01, 219/86.25, 86.7, 89, 90, 159, 161; 76/25 R, 45

[56] References Cited

U.S. PATENT DOCUMENTS

| 3,034,378 | 5/1962 | Anderson | 219/77 X |
| 3,295,396 | 1/1967 | Kolb | 76/25 R |
| 3,733,934 | 5/1973 | Stevenson | 219/77 X |
| 4,188,524 | 2/1980 | Trinchera | 219/77 X |
| 4,366,728 | 1/1983 | Beck et al. | 76/25 R |

FOREIGN PATENT DOCUMENTS

| 58419 | 1/1941 | Denmark | 219/78.01 |
| 1021102 | 12/1957 | Fed. Rep. of Germany | 219/117.1 |

Primary Examiner—E. A. Goldberg
Assistant Examiner—Teresa J. Walberg
Attorney, Agent, or Firm—Sughrue, Mion, Zinn, Macpeak, and Seas

[57] ABSTRACT

A welding apparatus for welding hard segments to the circumference of a base of a saw blade. The blade base is clamped between two electrodes of a first electrode unit which can rotate. The segment is clamped by conductive fingers of a second electrode unit which is movable toward the first electrode unit. A power clamp presses together the conductive fingers together. The second electrode unit can rock to uniformly press the segment against the circumference of the blade base.

11 Claims, 4 Drawing Sheets

SAW BLADE SEGMENT WELDING APPARATUS

BACKGROUND OF THE INVENTION

1. Field of the Invention

This invention relates to a resistance welding apparatus for welding divided small thin segments to a blade base to form a rotary saw blade. More particularly the invention relates to an electrode clamp apparatus whereby the segments are pressed against the blade base to ensure uniform contact between the segments and the base during the welding apparatus.

2. Background of the Invention

A saw blade 0 for use as a concrete cutting tool is, as shown in FIGS. 1A and 1B, for instance, generally prepared by forming radial shallow slitted grooves 2 at equal intervals in the circumferential direction of a discoidal blade base 1. Small hard pieces of segments 3 equivalent to the edges of the saw blade are joined to the peripheral surfaces thus divided and formed between the adjoining slitted grooves.

High-carbon steel is normally used for the blade base 1 because of its high resistance to shock and fatigue. On the other hand, wear resistant sintered metal including diamond as a constituent is used for the segments 3 which form the edge of the saw blade. To weld the segments to the blade base, brazing with a relatively high melting point has conventionally been employed.

The conventional brazing method employs silver filler mental with comparatively high melting point. However, due to the frictional heat generated during dry cutting, the brazed material at the joint where the segment contacts the blade base deteriorates as the temperature exceeds the melting point of the filler metal. As a result, the mechanical strength of the joint is lost, which causes the segment to peel off. In addition to the above drawbacks, is the high level of skill required in the manufacturing process and the high cost of the brazing material.

SUMMARY OF THE INVENTION

Accordingly, an object of the present invention is to provide a method of joining the segments to the base such that the joint is heat-resistant.

A further object is to provide a joining method which does not require expensive brazing materials.

A saw blade segment welding apparatus developed in accordance with the present invention is provided with a very useful electrode clamp and is intended for use in manufacturing saw blades efficiently without damaging their mechanical strength and finished accuracy in welding. The welding apparatus employs resistance welding rather than the conventional joining method welding.

DETAILED DESCRIPTION OF THE PREFERRED EMBODIMENTS

Figure 2:
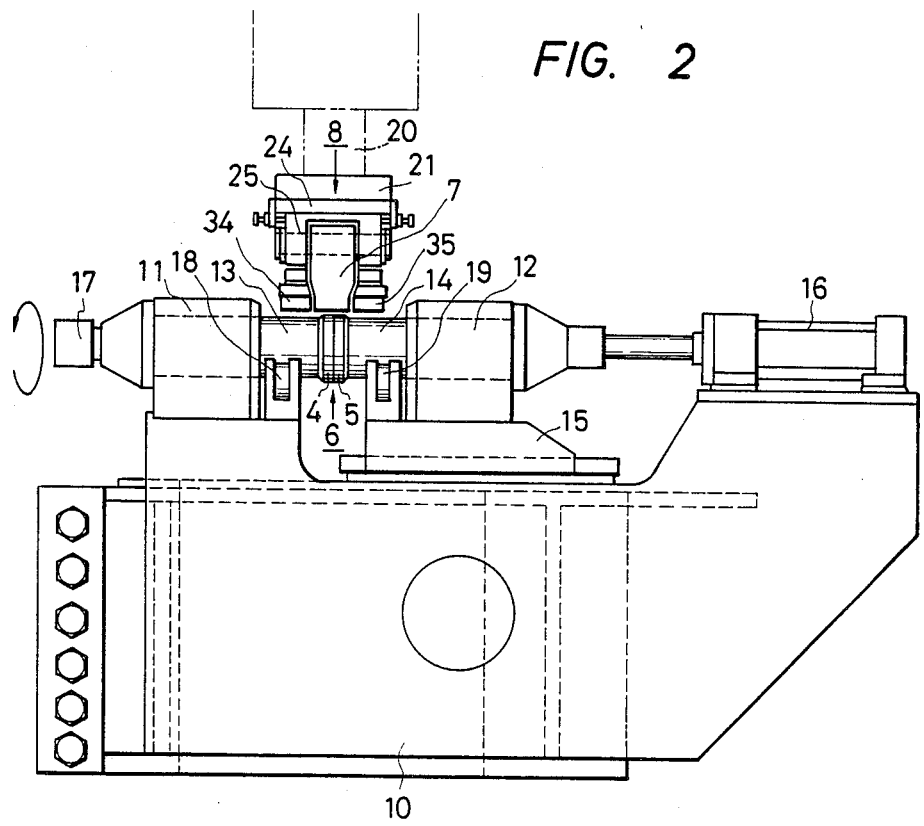
FIG. 2 is an elevational view of a saw blade segment welding apparatus embodying the present invention.
Figure 3:
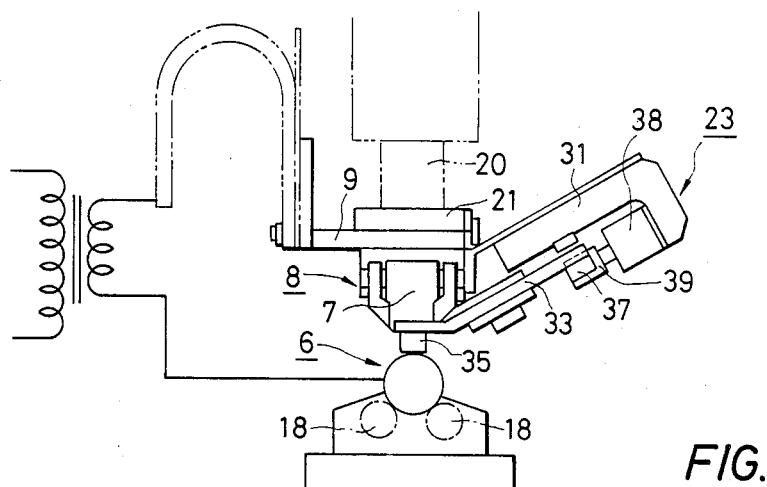
FIG. 3 is a side view of FIG. 2.

The resistance welding machine according to the present invention comprises, as shown in FIGS. 2 and 3, a lower electrode section 6 including clamping electrodes 4 and 5 for positioning and holding a blade base 1 of the saw blade therebetween. An upper electrode 8 is vertically movable. The upper electrode 8 includes a power feed chuck 7 for holding a segment 3 on the periphery of the blade base 1. The upper electrode section 8 is lowered to place the segment 3 against the peripheral surface of the blade base 1 on the lower electrode section 6. The resistance welding machine is characterized in that the lower electrode section 6 is equipped with a rotary feed mechanism 17 for indexing the welding position on the outer periphery of the blade base 1 by rotating the electrodes 4 and 5 while the blade base 1 is clamped. The segments are welded to the periphery of the blade base 1 one after another by means of projection welding.

There is provided an arrangement of switching conductive fingers 26 and 27 (FIG. 5) and a clamp unit (FIG. 4) for clamping the conductive fingers from both sides and for holding the segment 3 at the front ends of the conductive fingers 26 and 27. The conductive fingers 26 and 27 are supported in such a manner as being capable of rocking so that the segment is uniformly pressed against the outer periphery of the blade base 1 when the segment 3 is welded.

The function and operation of the apparatus according to the present invention will subsequently be described.

Figure 1A:
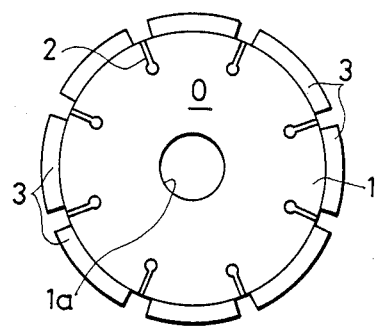
FIG. 1A is an elevational structural view showing a saw blade.
Figure 1B:
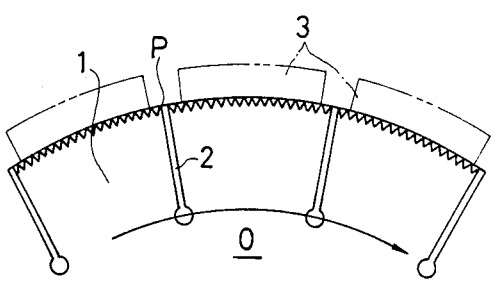
FIG. 1B is a structural view illustrating a saw blade to be welded using an apparatus embodying the present invention.

As shown in FIG. 1B, projections P are beforehand formed on the peripheral surface of the blade base 1. The segment 3 is set in a clamp of the upper electrode section 8. In this case, the conductive finger 27 on one side is manually opened about a fulcrum Q and the segment 3 is forced in from below. The predetermined clamp position of the conductive finger 26 and 27 is is such that the segment abuts against a stopper 29 when inserted. If the opened conductive finger 27 is released, it shuts automatically due to the force applied by a spring S, whereby the segment is held between the conductive fingers 26 and 27.

Subsequently, by operating a cylinder 38 of a clamp unit 23 shown in FIG. 4, a wedgelike tapered block 39 is forced in between the guide rollers 36 and 37 of clamp arms 32 and 33. At their other ends, the clamp arms 32 and 33 have pressure rollers 34 and 35 disposed against the outsides of the conductive fingers 26 and 27. By the operation of the cylinder 38, the conductive fingers 26 and 27 are pressed between the pressure rollers 34 and 35 and are subjected to high-pressure clamping force, whereby the segment 3 is tightly clamped.

The welding position of the blade base 1 is practically determined by predeterminately rotating the clamping electrodes 4 and 5 while the blade base 1 is clamped. After the welding position is thus determined, the clamping upper electrode section 8 is lowered and the segment 3 is pressed against the upper edge of the blade base 1.

If a gap exists between the joint area of the segment 3 and the peripheral surface of the blade base 1 because of the inclination of the segment 3, the contact state becomes irregular. However, the conductive fingers 26 and 27 are caused to move in the circumferential direction of the blade base 1 around a driving shaft 28 and this rotation works to modify the inclination of the segment 3 with respect to the blade base 1. Thereby the conductive fingers 26 and 27 uniformly press the whole joint area of the segment 3 and form a gap-free contact state under proper conditions so that the segment is welded in proper condition under uniform pressure.

The rotary feed mechanism 17 is operated after the welding of one segment is completed and the lower electrode section 6 and the blade base 1 are integrally rotated to move a new welding portion on the periphery of the blade base 1 up to the position of upper electrode section 8. Segments 3 are set repeatedly and welded to the whole periphery of the blade base by projection welding.

A saw blade can thus be made by projecting welding less costly with accuracy in a short time.

Figure 4:
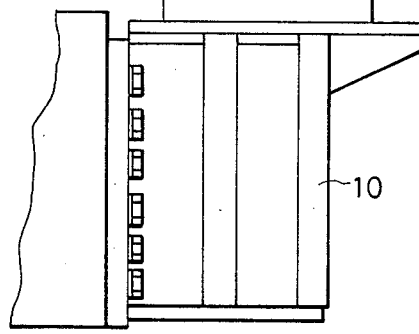
FIG. 4 is a top plan view of a clamp unit.
Figure 4:
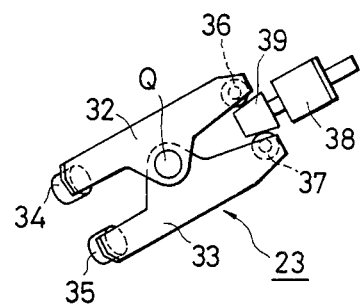
Figure 5:
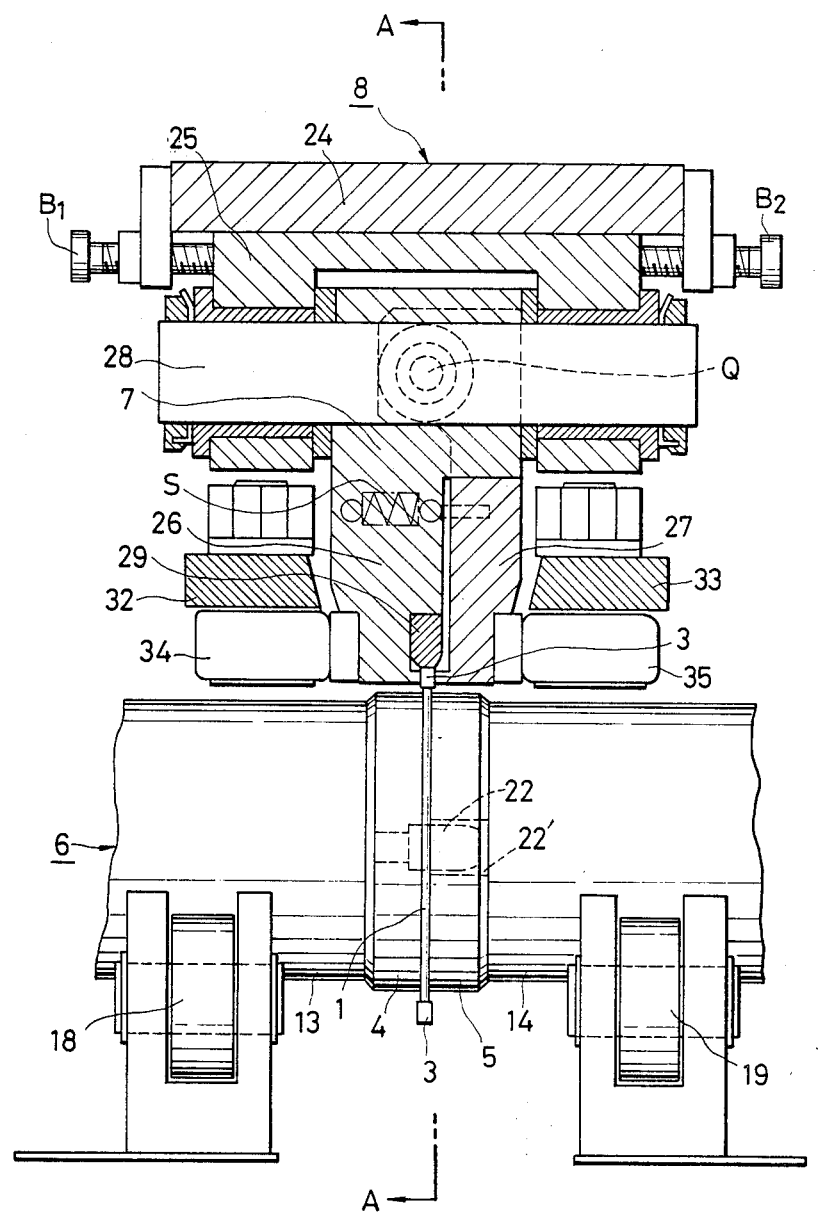
FIG. 5 is an enlarged sectional view of the principal portion descriptive of the construction of an upper electrode means for the apparatus according to the present invention.
Figure 6:
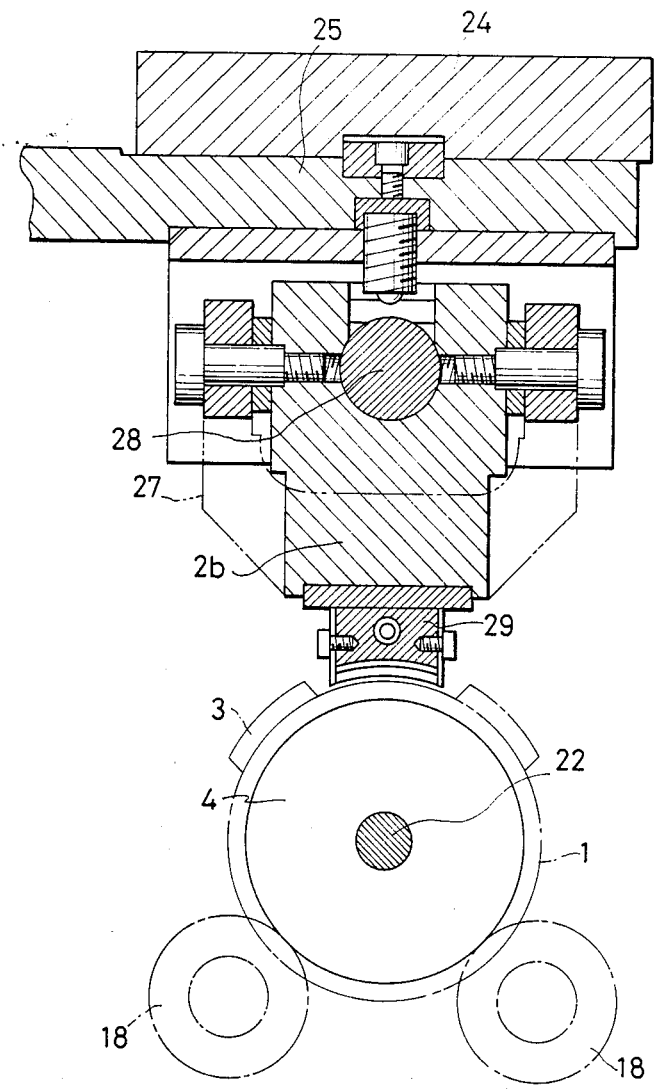
FIG. 6 is a sectional view taken on line A—A of FIG. 5.

Referring now to FIGS. 2 through 6, an embodiment of the present invention will be described in further detail. FIGS. 2 and 3 are respectively an elevational view and a side view of an apparatus embodying the present invention. FIG. 4 is a plan view of the clamp unit 23. FIG. 5 is an enlarged sectional view showing the principal portion of the upper electrode section 8 for the apparatus according to the present invention. FIG. 6 is a sectional view taken on line A—A of FIG. 5. The lower electrode section 6 is installed on a table 10 coupled to the body frame (not shown) of a welding machine and is equipped with the discoidal clamping electrodes 4 and 5 horizontally facing each other. The electrodes 4 and 5 are respectively fitted to the front end of electrode feed power shafts 13 and 14 rotatably supported in electrode casings 11 and 12. The electrode casing 11 on one side is held securely in position, whereas the electrode casing 12 on the other is fixed to a slide base 15 on the table 10. The electrode casing 12 is so arranged as to move back and forth relative to the fixed electrode casing 11, together with the slide base 15 in response to the stroke of a cylinder 16 fixed onto the table 10.

Accordingly, the lower electrode section 6 is arranged as an electrode clamp whose function is both to clamp a blade base 1 to be set vertically and to simultaneously feed electrical power.

As shown in FIG. 5, the diameters of the clamp faces of the electrodes 4 and 5 are in practice set to be 1–2 mm smaller than that of the blade base 1 so that the blade base 1 may be clamped up to the time immediately before it is set in position for welding. A guide pin 22 (FIG. 5), protruding from the center of the clamp face of the electrode 4, is used to position the blade base 1 by fitting into a hole 1a bored in the center of the blade base 1, whereas a hole 22' bored in the clamp face on the other electrode 5 is used to receive the guide pin 22. The fixed electrode casing 11 is equipped with a rotary feed mechanism 17 for causing the electrode power feed shafts 13 and 14 to jointly rotate counterclockwise as shown by an arrow A while the blade base 1 is being clamped with both the electrodes 4 and 5 so that a welding position on the periphery of the blade base 1 is thereby indexed.

For the rotary feed mechanism 17, use can be made of any other means such as a rotary mechanism manually operated with a handle, one-way clutch or motor.

Under both the electrode power feed shafts 13 and 14 of the lower electrode section 6 are two pairs of back-up rollers 18 and 19 installed to prevent the clamped site of the blade base 1 from distorting when pressure is applied to an upper electrode means 8 as described hereinafter.

The upper electrode clamp section 8 for the segments according to the present invention is equivalent to the upper electrode section corresponding to the lower electrode section 6. As shown in FIG. 3, the upper electrode clamp section 8 is supported with a platen 21 of a moving ram 20 through a secondary conductor 9. The moving ram 20 is moved up and down by a pressure cylinder (not shown) fixed to the upper arm of the body frame of the welding machine.

As shown in FIG. 5, the upper electrode clamp section 8 is equipped with a power feed chuck 7 for holding the segment 3 and the clamp unit 23 of FIG. 4 for providing the power feed chuck 7 with high-pressure clamping force. As shown in the detailed sectional view of FIG. 5, an electrode holder 25 whose position can be adjusted transversely by adjusting bolts $B_1$ and $B_2$ is supported under a holder frame 24 supported with the platen 21. The pair of conductive fingers 26 and 27 capable of clamping using the same shaft Q as a fulcrum are additionally pivotally supported in the transverse direction with a drive shaft 28 forming a rocking mechanism in such a manner as to be movable in the circumferential direction (in the direction perpendicular to the view of FIG. 5) of the blade base 1. That is, it has been so arranged that, when pressure is applied to the segment 3 while it is practically chucked, the pressure can uniformly be applied to the joint area of the segment along the peripheral curved surface of the blade base 1.

In between the two conductive fingers 26 and 27 is the stopper 29 having a curved surface and fitted to the inside of the conductive finger 26 on one side. The stopper 29 is used to determined the clamp position when it abuts against the curved back surface of the inserted segment 3. Moreover, a small clamping force is always applied by a spring S as a resilient pressure means between the two conductive fingers 26 and 27 but the conductive finger 27 on one side may be opened manually.

On the other hand, the clamp unit 23 used as a clamp pressure applying mechanism is designed to apply high-pressure clamping force by causing the conductive fingers 26 and 27 to tightly contact the segment 3 from both sides to prevent the segment from slipping off the conductive fingers 26 and 27. As shown in FIGS. 3 and 4, a pair of tilted clamp arms 32 are 33 capable of swinging about the same shaft Q as a fulcrum are fitted to a bracket 31 fixed to the holder 25. Pressure rollers 34 and 35 are fitted to the front ends of the clamp arms 32 and 33, with the front ends the clamp arms 32 and 33 being horizontally curved on both sides of the conductive fingers 26 and 27. A wedgelike tapered block 39 can be inserted in between guide roller 36 and 37 fitted to the rear ends of the clamp arms 32 and 33 by the operation of the cylinder 38 positionally fixed to the bracket 31. When the tapered block 39 is projected into the space between the guide roller 36 and 37, the wedgelike tapered surface is caused to press the outer peripheries of the guide rollers 36 and 37 and thus the rear ends of the clamp arms are forced apart. Then high-pressure energizing force is applied to the pressure rollers 34 and 35 at the front ends of the clamp arms 32 and 33 to force the rollers 34 and 35 at the front ends of the clamp arms 32 and 33 to force the rollers 34 and 35 thus pressed to tightly hold the conductive fingers 26 and 27 therebetween to ensure that the segment 3 is clamped.

With the above arrangement, the operation of the apparatus according to the present invention will subsequently be described. The blade base 1 with projections on the outer peripheral surface is first inserted in between the opened electrodes 4 and 5 of the lower electrode section 6. By operating the cylinder 16, the electrode 5 together with the electrode casing 12 is moved close to the fixed electrode 4 to position and vertically hold the blade base 1 from both sides with predetermined clamping force.

Subsequently, the segment 3 is inserted upwardly and set in the inactive upper electrode section 8 by manually or automatically opening with the fulcrum Q is the center, the conductive finger 27 of the power feed chuck 7. In this case, the segment 3 is positioned by the stopper 29 on the outer periphery of the blade base and held in between the conductive fingers 26 and 27 only by the pressure applied by the spring S.

The cylinder 38 of the clamp unit 23 is actuated to insert the wedgelike tapered block 39 in between the guide roller 38 and 39 of the clamp arms 32 and 33. The pressure rollers 34 and 35 subjected to the high-pressure clamping force are forced to press the conductive fingers 26 and 27 to ensure that the segment 3 is clamped.

Subsequently, the rotary feed mechanism 17 is employed to adjust the position of the blade base 1 and the upper electrode means 8 is lowered to press the segment 3 against the peripheral surface of the blade base 1. When the segment 3 is pressed against the blade base 1, the power feed chuck 7 is caused to move in the circumferential direction of the blade base 1 around the driving shaft 28 to uniformly press the whole joint area of the segment and to prevent the joint area of the segment 3 from unevenly contacting the peripheral surface of the blade base 1.

While the segment 3 is uniformly pressed against and allowed to contact the blade base 1 in good condition, welding current is supplied to the upper and lower electrode sections 6 and 8. The current is concentrated in the projections P, so that the segment is welded for a short time by making use of resistance heating.

After one segment 3 is welded, the clamp unit 23 is opened to lift the upper electrode section 8 and the lower electrode section 6 is rotated by the rotary feed mechanism 17 in preparation for welding the next segment 3, whereby the next welding position is indexed. A segment 3 is set in the upper electrode means 8 and the welding work is again carried out.

With a simple setting of the blade base 1 in the lower electrode section 6, the segments 3 can repeatedly be welded without releasing the electrode clamp 6 until the welding of the segments 3 to the whole periphery of the blade base 1 is complete. Although a description has been given of a case where the blade base is vertically positioned and clamped, the method of clamping the blade base is not limited to that arrangement and it may be horizontally clamped.

Moreover, it is possible to weld saw blades of various sizes by operating the electrodes and power feed chuck in accordance with the present invention.

As set forth above, the flow of welding current is concentrated through the projections formed in the joint area of either the blade base or the segment and, when the blade base and the segment are submitted to projection welding, uniform pressure is applied to both sides of the conductive fingers with the high-pressure clamp force derived from the clamp unit, whereby a small thin segment can firmly clamped. Moreover, the conductive fingers are totally caused to move in the circumferential direction of the blade base on the driving shaft in order to prevent the joint area of the segment from unevenly contacting the peripheral surface of the blade base to ensure that the whole joint area of the segment is uniformly pressed. The electrodes and the blade base are jointly rotated practically without releasing the electrode clamp of the blade base until the segments are completely welded to the whole periphery of the blade base. While the welding position on the periphery of the blade base is indexed, the segments can be submitted to projection welding one after another. In consequence, a saw blade can be made inexpensively in a very short time as compared with what is made under the conventional method. Furthermore, the conventional saw blade is affected by intense frictional heat generated during work and the high temperature deterioration of brazing material often allows the segment to peel off. On the contrary, not only strong joint areas highly resistant to frictional heat and mechanical stocks but also high product precision have been made available by projection welding according to the present invention. Therefore, the life of the segment is prolonged, whereas project reliability can be improved to a greater extent.

What is claimed is:

1. A saw blade welding apparatus, comprising:
    a first electrode unit including two first electrodes movable toward each other and rotatable about a common axis for positioning and holding between said two first electrodes a blade base of a saw blade, said common axis extending in a direction perpendicular to planes of contact between said two first electrodes and said blade base;
    a rotary feed mechanism for rotating said two first electrodes and said blade base to a plurality of predetermined positions while said two first electrodes hold said blade base;
    a second electrode unit including a power chuck for holding a segment on an outer periphery of said blade base, said second electrode unit being movable toward said first electrode unit transversely to said common axis; and
    a power source connectable between said first and second electrode units for welding said held segment to said held blade base.

2. A welding apparatus as recited in claim 1, wherein said power feed chuck comprises:
    at least two movable conductive fingers connectable to said power source for clamping opposing sides of said segment; and
    a clamp unit for pressing opposing outer sides of said conductive fingers to clamp said segment at free ends of said conductive fingers.

3. A welding apparatus as recited in claim 2, further comprising a rockable support for said conductive fingers whereby said segment is uniformly pressed against said outer periphery of said blade base.

4. A welding apparatus as recited in claim 3, wherein said support is rockable in a plane transverse to said common axis.

5. A welding apparatus as recited in claim 2, wherein said clamp unit comprises:
    two clamp arms pivoting on a common pivot;

a wedge member insertable between said clamp arms toward said common pivot; and power means for driving said wedge member toward said common pivot.

6. A welding apparatus as recited in claim 3, wherein said clamp unit comprises:

two clamp arms pivoting on a common pivot;

a wedge member insertable between said clamp arms toward said common pivot; and power means for driving said wedge member toward said common pivot.

7. A welding apparatus as recited in claim 1, further comprising:

two shafts rotatable on said common axis and supporting respective ones of said first electrodes, at least one of said shafts being electrically powered; and guides supporting said shafts.

8. A welding apparatus as recited in claim 7, wherein at least one of said guides is movable along said common axis.

9. A welding apparatus as recited in claim 2, further comprising:

two shafts rotatable on said common axis and supporting respective ones of said first electrodes, at least one of said shafts being powered; and guides supporting said shafts.

10. A method of welding a cutting edge to a circumference of a base of a saw blade for use as a cutting tool which comprises:

positioning and holding a blade base of a saw blade between two first electrodes which are movable towards each other and rotatable about a common axis, said common axis extending in a direction perpendicular to planes of contact between said two first electrodes and said blade base;

rotating said two first electrodes and said blade base with a rotary feed mechanism while said two first electrodes hold said blade base so as to position said blade base in a predetermined position;

moving said second electrode unit toward said first electrode unit in a direction transverse to said common axis;

holding a blade segment on an outer periphery of said blade base using said second electrode unit;

welding said held segment to said held blade base by operating a power source connected between said first and second electrode units.

11. A method of welding a cutting edge to a saw blade base as recited in claim 10, wherein said second electrode unit includes a power chuck for holding said blade segment on an outer periphery of said blade base.

* * * * *